H. W. MICHAEL.
EXHAUSTER FOR HEATING SYSTEMS.
APPLICATION FILED JUNE 1, 1912.
1,090,788.
Patented Mar. 17, 1914.
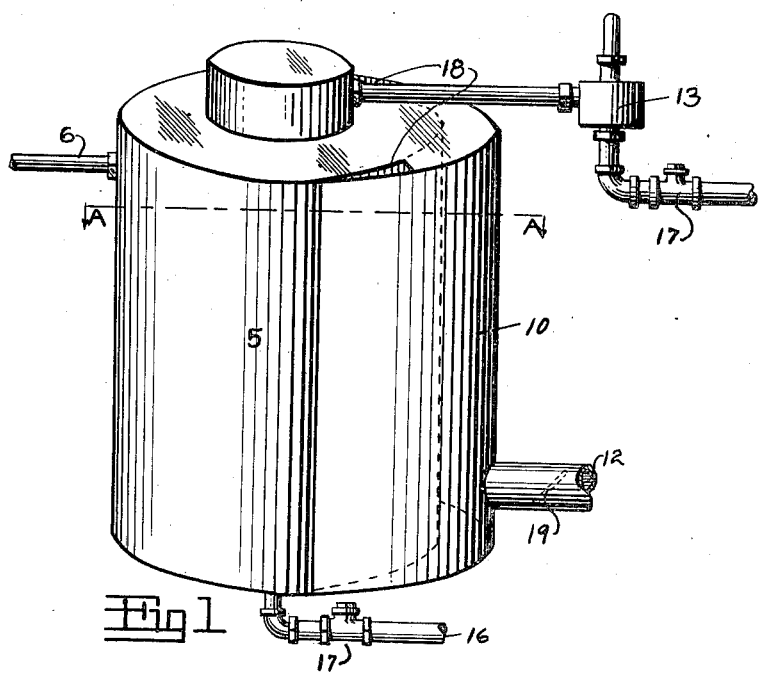
Fig 1
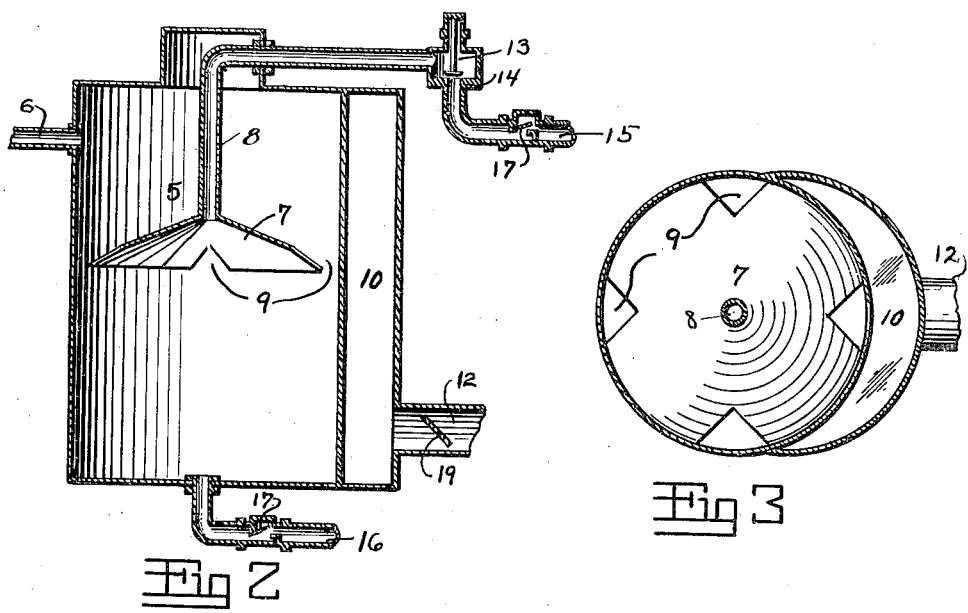
Fig 2
Fig 3
WITNESSES:
INVENTOR.
HENRY W. MICHAEL.
BY
John G. Powell
ATTORNEY.

UNITED STATES PATENT OFFICE.

HENRY W. MICHAEL, OF DENVER, COLORADO.

EXHAUSTER FOR HEATING SYSTEMS.

1,090,788.　　　　　Specification of Letters Patent.　　Patented Mar. 17, 1914.

Application filed June 1, 1912. Serial No. 701,066.

*To all whom it may concern:*

Be it known that I, HENRY W. MICHAEL, a citizen of the United States, residing in the city and county of Denver and State of Colorado, have invented new and useful Improvements in Exhausters for Heating Systems; and I do declare the following to be a full, clear, and exact description of my invention, such as will enable others skilled in the art to which it appertains to make and use the same, reference being had to the accompanying drawing, and to the figures of reference marked thereon, which form a part of this specification.

My invention relates to improvements in exhausters for heating systems and has for its object the provision of a device of this character for effectively drawing or exhausting the air from the radiators and pipes or mains of the system, to make room for the live steam in the said pipes or mains.

Another object of my invention is to provide an inexpensive, simple and effective device for exhausting the air from the radiators and pipes of a heating system.

Another object of my invention is to provide a device, wherein the condensation of the steam will produce the motive power for exhausting the air from the radiators and pipes of the heating system.

Still another object of my invention is to provide a device for automatically closing off the exhaust to the atmosphere after the radiators and pipes of the heating system have been exhausted of the air.

Still another object of my invention is to provide a device for separating the condensed steam from the air, and to allow the air to escape, while the condensation of the steam may be utilized for producing the necessary motive power for exhausting the air from the radiators and pipes of the heating system.

With these and other objects in view, I will proceed to describe my invention with reference to the accompanying drawing.

In this drawing:—Figure 1 is a perspective view of my exhauster. Fig. 2 is a longitudinal sectional view of the same. Fig. 3 is a cross sectional view, taken on the line A—A Fig. 1.

Throughout this specification the same reference characters will be used to represent the same parts in all the views.

My improved exhauster for heating systems consists of a main receptacle 5, into which the steam, from the pipes or mains of the heating system, enters through a pipe 6, connected with the receptacle 5 near the top of the latter, and strikes, or comes into contact with a deflector 7, supported in the receptacle 5 by means of the wall of the latter. A pipe 8 is connected with this deflector 7 and forms the outlet for the air from the receptacle 5. This deflector 7 is of conical shape and tapers downwardly into engagement with the wall of the receptacle 5, whereby the condensed steam or water is directed toward the wall of the receptacle and is caused to follow down the wall of the receptacle through openings 9 formed in the outer edge of the deflector 7. The receptacle 5 is partially surrounded by a cold air chamber 10, which communicates with the atmosphere through a pipe 12, connected with the said cold air chamber near the bottom of the latter.

Before proceeding further with my description, I wish it understood that my exhauster is preferably arranged in the basement of the building, some distance above the water line of the boiler, and that it is the purpose of the exhauster to produce a vacuum in the receptacle 5, whereby a suction in the pipes or mains of the heating system is created, resulting in drawing the air from the radiators and mains or pipes into the receptacle. After all of the air has been drawn from the radiators and pipes or mains of the heating system, the steam will enter the receptacle 5 and will be condensed therein in a manner which will later be described more definitely. The condensed steam requires considerably less space than the steam and consequently when the steam is condensed in the receptacle 5, a partial vacuum is created sufficient to produce a suction in the radiators and pipes or mains of the heating system.

Now supposing that steam is entering the receptacle 5 through the pipe 6, it will of course take the shortest upward course, which is through the openings 9 of the deflector 7 and thence through the pipe 8 into contact with a thermostatic valve piece 13. The steam raises the temperature in the vicinity of this thermostatic valve piece and acts upon the latter to cause the same to expand into engagement with a seat 14, formed in the thermostatic valve housing, and close off the exhaust to the atmosphere, through a pipe 15 leading out of the basement to the atmosphere. Now since the steam is trapped in the receptacle 5, the influence of the cold air chamber 10 will cause the steam to condense in the said receptacle and leave a partial vacuum therein and as soon as the steam has been cut off from the radiators and pipes or mains of the heating system, the vacuum will draw all of the air from the said radiators and pipes or mains, whereby when the steam is again turned into the said radiators and pipes or mains it will be permitted to freely circulate therethrough. Of course when the steam is turned off, the temperature in the vicinity of the thermostat 13 will fall and allow the latter to contract and open the exhaust pipe 15. Now as the air enters the receptacle 5, under the influence of the vacuum created therein by the condensation of the steam, the air will pass under the deflector 7, through the openings 9 formed therein, and out through the pipes 8 and 15 to the atmosphere, while the water from the steam, which is condensed within the receptacle, will pass through the openings 9 in the deflector and return to the boiler through a pipe 16, which is connected with the bottom of the receptacle. Each of the pipes 15 and 16 is provided with a back pressure valve 17, which prevent the air and water from returning to the receptacle 5 after once having passed said valves. These valves are pivoted and arranged to open in the direction of the exit of the air and water and to close under the influence of the back passage of the said air and water.

The pipe 12, preferably, leads out of the basement to the outer atmosphere, whereby a sufficient quantity of cold air is permitted to pass through this pipe into the cold air chamber 10. The cold air circulates up through this cold air chamber 10 and leaves the same through openings 18, formed in the top of the said cold air chamber. By virtue of this construction a constant circulation of the cold air is maintained through said cold air chamber.

The deflector 7 serves to distribute the steam and direct it into contact with the wall of the receptacle 5, where it is subjected to the direct action of the cold air, in the cold air chamber 10, for converting the steam into water of condensation. As heretofore explained, and as is obvious, the steam takes up considerably more space than the condensed steam. Therefore when the steam is condensed a partial vacuum will be left in the receptacle 5, which will result in drawing all of the air from the radiators and pipes or mains of the heating system.

The pipe 12 is controlled by means of a damper 19, whereby the circulation of the cold air in the cold air chamber 10 may be cut off whenever it is desired.

It is understood that the influence of the heat resulting from the steam in the receptacle 5, will act to maintain a perfect circulation of cold air through the cold air chamber 10, and the theory and principle need not be described here.

While I have described and illustrated herein a specific form of my invention, it is understood that I am not limited thereto and that the same may be varied and modified without departing from the spirit of my invention as determined by the domain of the appended claims.

Having thus described my invention, what I claim and desire to secure by Letters Patent is:—

1. An exhauster for heating systems, comprising a receptacle, the said receptacle communicating with the heating system, the said exhauster having a cold air chamber adjacent thereto, said cold air chamber being in communication with the atmosphere, and a deflector arranged in the receptacle, for the purpose set forth.

2. An exhauster for heating systems, comprising a receptacle in communication with the heating system, the said receptacle having a cold air chamber adjacent thereto and in communication with the atmosphere, a deflector arranged in the receptacle beneath its communication with the system, a pipe leading from the said deflector to the atmosphere, and a thermostat controlling said pipe, for the purpose set forth.

3. An exhauster for heating systems, comprising a receptacle in communication with the heating system, the exhauster having a cold air chamber in communication with the atmosphere and arranged adjacent the said receptacle, a pipe leading from the bottom of the receptacle to the boiler, a pipe also leading from the receptacle to the atmosphere, and a deflector arranged in the receptacle beneath the latter's communication with the heating system and provided with openings therein for the passage of the steam and air to the lower side of the deflector.

4. Means for exhausting air from heating systems, comprising a receptacle located in the heating system, a deflector arranged in the said receptacle below the induction to the said receptacle from the heating system, the said deflector being of conical shape and inclined downwardly to the wall of the receptacle, the said deflector having openings therein adjacent the wall of the receptacle to permit the air and water to pass below the said deflector, a pipe connected with the said deflector and communicating with the lower side of the latter, said pipe leading to the atmosphere, a second pipe connected with the bottom of the said receptacle and forming the return to the heating system, and the said receptacle having a cold air chamber arranged adjacent thereto, for the purpose set forth.

In testimony whereof I affix my signature in the presence of two witnesses.

HENRY W. MICHAEL.

Witnesses:
 JNO. G. POWELL,
 FELIX THIES.

Copies of this patent may be obtained for five cents each, by addressing the "Commissioner of Patents, Washington, D. C."